United States Patent [19]
Watabe

[11] 3,716,217
[45] Feb. 13, 1973

[54] TRAILER CAPABLE OF LIFTING AND LOWERING BOATS OR THE LIKE

[75] Inventor: Masahiro Watabe, Kawanishi, Japan

[73] Assignee: Usui Kokusai Songyo Kabushiki Kaisha, Sunto-gun, Shizuoka-ken, Japan

[22] Filed: Dec. 1, 1970

[21] Appl. No.: 93,935

[52] U.S. Cl. .............................................. 254/139.1
[51] Int. Cl. .............................................. B66c 23/60
[58] Field of Search ....254/4 R, 4 B, 4 C, 139.1, 143, 254/145; 280/414; 214/505, 1 A

[56] References Cited

UNITED STATES PATENTS 3,111,225  11/1963  Miller et al. ................... 254/139.1 X 3,601,269  8/1971  Heinig ........................... 214/1 A X

FOREIGN PATENTS OR APPLICATIONS 1,295,584  5/1962  France ........................... 280/414 R

*Primary Examiner*—Gerald M. Forlenza
*Assistant Examiner*—Frank E. Werner
*Attorney*—Wenderoth, Lind & Ponack

[57] ABSTRACT

A trailer capable of lifting and lowering boats or the like which includes a trailer body of the type known per se having a winch device mounted thereon, and a foldable crane assembly pivotally connected to the rear end of the trailer body, whereby the crane assembly can be moved between a raised or operative position and a folded or inoperative position.

2 Claims, 18 Drawing Figures

PATENTED FEB 13 1973

MASAHIRO WATABE,
INVENTOR

BY Wenderoth, Lind
and Ponack ATTORNEYS

MASAHIRO WATABE,
INVENTOR

MASAHIRO WATABE,
INVENTOR

BY Wenderoth, Lind
and Ponack ATTORNEYS

MASAHIRO WATABE,
INVENTOR

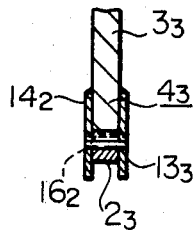
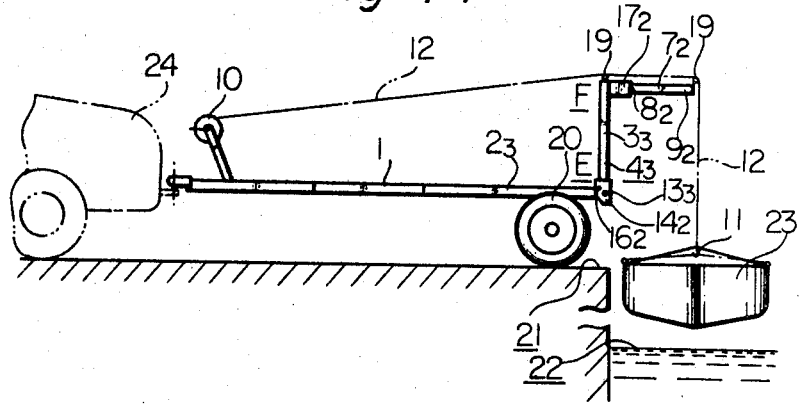
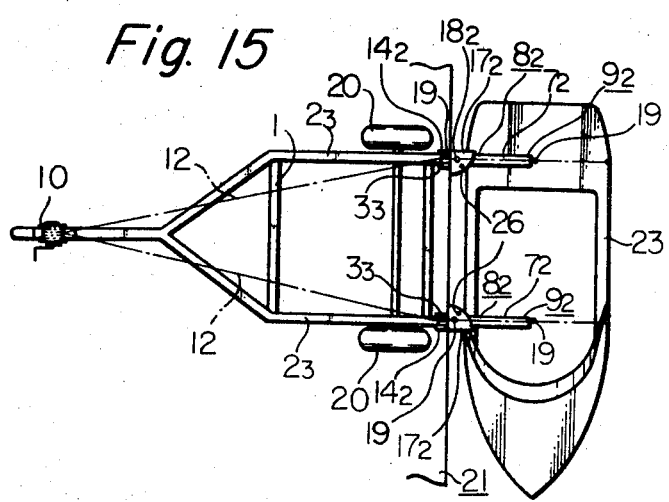

MASAHIRO WATABE,
INVENTOR

BY Wenderoth, Lind
and Ponack ATTORNEYS

TRAILER CAPABLE OF LIFTING AND LOWERING BOATS OR THE LIKE

BACKGROUND OF THE INVENTION

1. Field of the Invention

This invention relates to a trailer, and more particularly to a trailer which is capable of lifting and lowering boats or the like by using a foldable crane assembly integrally attached to a trailer body of the type known per se.

2. Description of the Prior Art

Heretofore, great difficulties have been experienced in lifting boats or the like from the surface of water onto a trailer or unloading the boats from the trailer onto the surface of water, because trailers used for the transportation of boats or the like are not usually equipped with a crane or other lift means and a great deal of human labor or the like has been required to load or unload the trailers if no crane or other suitable lift means is provided in the place of loading or unloading. Also, in the case where a trailer is equipped with a crane or like lift means, such lift means is not of the foldable type and the trailer necessarily becomes bulky in construction.

SUMMARY OF THE PRESENT INVENTION

It is therefore the main object of the present invention to provide a trailer which is capable of lifting and lowering boats or the like with great ease and which occupies no great space when the trailer is not in its operative position.

According to a feature of the present invention, the trailer comprises a trailer body of the type known per se, and a crane assembly connected to the rear end of the trailer body for lifting boats or the like. The crane assembly may comprise at least one support rod and at least one operating rod. The support rod is pivotally connected at one end thereof to the rear end of the trailer body, and the operating rod is pivotally connected to the other end of the support rod, whereby the crane assembly may be folded in a plane common to the horizontal plane of the trailer body. A winch device is mounted on the trailer body in the forward end portion thereof, and a wire rope having a free end provided with hook means is wound on the winch device and extended therefrom along the operating rod of the crane assembly.

According to another feature of the present invention, the crane assembly may comprise an inverted U-shaped frame including a pair of support rods integrally interconnected at the upper ends thereof by a transverse bridge member, the support rods being connected at the lower ends thereof to the trailer body for pivotal movement in a vertical plane, and a single operating rod connected to the transverse bridge member centrally thereof for pivotal movement in a vertical plane.

According to still another feature of the present invention, the crane assembly may comprise a single support rod connected at one end thereof to the rear end of the trailer body for pivotal movement in a vertical plane, and a pair of parallel operating rods connected to the support rod at the other end thereof for pivotal movement in a horizontal plane.

According to yet another feature of the present invention, the crane assembly may comprise an inverted U-shaped frame including a pair of support rods integrally interconnected at the upper ends thereof by a transverse bridge member, the support rods being connected at the lower ends thereof to the trailer assembly for pivotal movement in a vertical plane, and a pair of parallel operating rods connected to the pair of support rods at the upper ends thereof for pivotal movement in a horizontal plane.

These and other features of the present invention will become more apparent from the following detailed description of specific embodiments when taken in conjunction with the accompanying drawings.

BRIEF DESCRIPTION OF THE DRAWINGS

FIG. 13 is a cross-sectional view taken along lines XIII—XIII of FIG. 11.

FIG. 14 is a side view of the trailer according to a third embodiment of the present invention.

FIG. 15 is a plan view of the same trailer.

DESCRIPTION OF THE PREFERRED EMBODIMENTS

Figure 1:
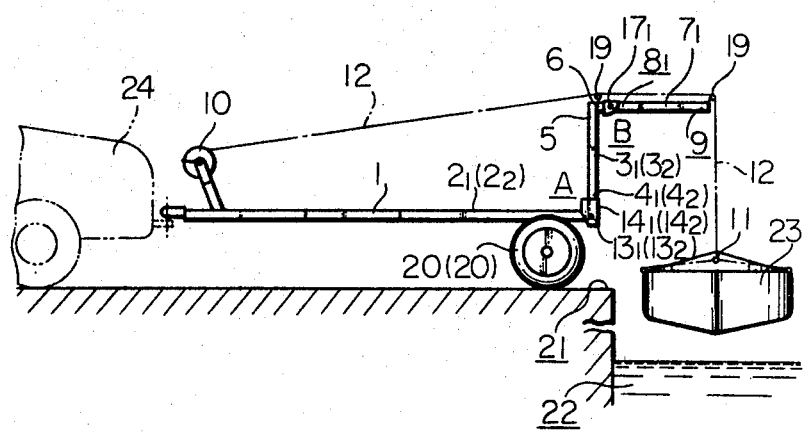
FIG. 1 is a side view of the trailer according to a first embodiment of the present invention.

The invention will be fully described hereunder with respect to certain preferred embodiments thereof shown in the drawings, throughout which like numerals designate like parts.

Figure 2:
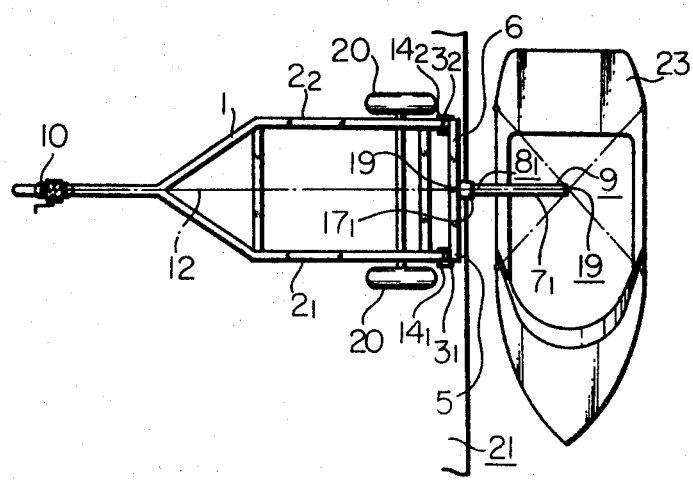
FIG. 2 is a plan view of the same trailer.
Figure 3:
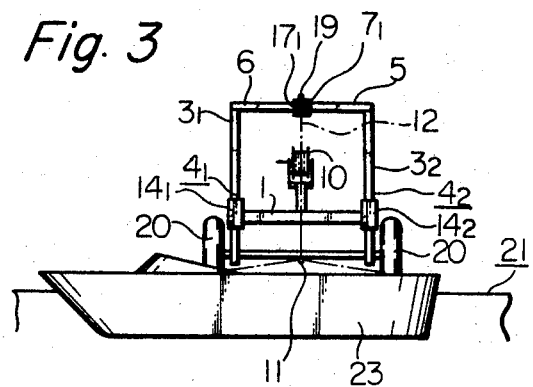
FIG. 3 is a rear end view of the same trailer.

Referring first to FIGS. 1 to 3, there is shown a first embodiment of a trailer of the present invention. A trailer body which may be of the type known per se includes a triangular trailer frame 1 having horizontally parallel side rods $2_1$ and $2_2$ formed integrally therewith. A pair of support rods $3_1$ and $3_2$ are pivotally connected at their lower ends $4_1$ and $4_2$ to the rear ends of the side rods $2_1$ and $2_2$ of the trailer body in a manner to be described. The support rods $3_1$ and $3_2$ are integrally interconnected at the upper ends thereof by a transverse bridge member 6 so as to form an inverted U-shaped crane frame 5. A single operating rod $7_1$ is pivotally connected at one end $8_1$ to the transverse bridge member 6 of the crane frame 5 in a manner to be described. At the opposite ends $8_1$ and 9 of the operating rod $7_1$ there are provided guide rollers or pulleys as will be described later. Thus, the crane frame 5 and the operating rod $7_1$ constitute a crane assembly.

A winch device 10 is mounted on the trailer body in the forward end portion thereof, and a wire rope 12 having a free end provided with hook means 11 is wound on the winch device 10 and paid away therefrom so as to pass along the operating rod $7_1$.

Figure 5:
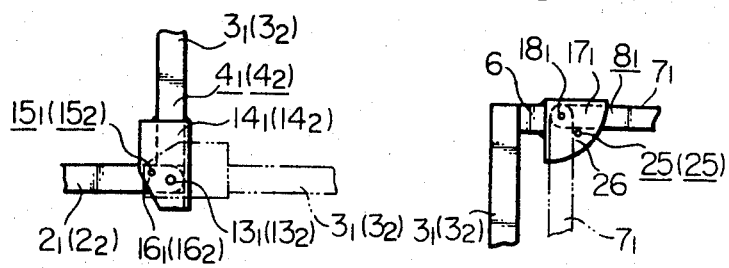
FIGS. 5 and 6 are enlarged side views showing portions A and B of FIG. 1.

The pivotal connection of the support rods $3_1$ and $3_2$ to the side rods $2_1$ and $2_2$ of the trailer body is clearly shown in FIG. 5. The support rods $3_1$ and $3_2$ of the crane frame 5 are pivotally connected at their lower ends $4_1$ and $4_2$ to the rear ends of the side rods $2_1$ and $2_2$ of the trailer body by means of shafts $13_1$ and $13_2$, respectively. The support rods $3_1$ and $3_2$ have brackets $14_1$ and $14_2$ secured thereto and formed with apertures $15_1$ and $15_2$, respectively. These apertures $15_1$ and $15_2$ are aligned with unseen apertures formed at the rear ends of the trailer side rods $2_1$ and $2_2$ when the crane frame 5 is brought into vertical position, so that set pins $16_1$ and $16_2$ may be inserted through the apertures $15_1$ and $15_2$ into the apertures of the trailer side rods $2_1$ and $2_2$ to thereby maintain the crane frame 5 in the vertical position.

Figure 6:
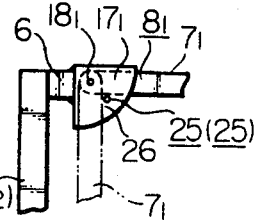

The pivotal connection of the operating rod $7_1$ to the transverse bridge member 6 of the crane frame 5 is clearly shown in FIG. 6. As shown, a bracket $17_1$ is secured to the transverse bridge member 6 centrally thereof, and the operating rod $7_1$ is pivotally connected to the bracket $17_1$ by means of a pivot shaft $18_1$. The bracket $17_1$ has a pair of apertures 25 formed therein to receive a set pin 26 when the operating rod $7_1$ is brought into the horizontal position, and thereby maintain the operating rod $7_1$ in the horizontal position. Guide rollers or pulleys 19 are provided at the opposite ends $8_1$ and 9 of the operating rod $7_1$ to guide the wire rope 12 paid away from the winch device 10.

The trailer body has a pair of wheels 20 mounted at the rear end thereof and resting on a shore 21. Above the surface of water 22 there is a boat 23 engaged by the hook means 11 provided at the free end of the wire rope 12. The fore end of the trailer body is connected to a suitable tracting vehicle 24.

Figure 4:
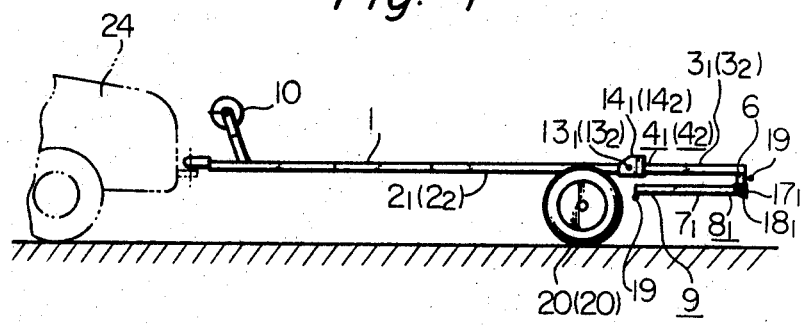
FIG. 4 is a side view of the same trailer with the crane assembly being in the folded or inoperative position.

In operation, the trailer is positioned on the shore 21 and the crane frame 5 is brought into the vertical position while the operating rod $7_1$ is brought into the horizontal position, as shown in FIG. 1. The set pins $16_1$ and $16_2$ are inserted into apertures $15_1$ and $15_2$ of the brackets $14_1$ and $14_2$ and further into the unseen apertures of the trailer side rods $2_2$ and $2_2$ which are now in alignment with the apertures $15_1$ and $15_2$, while the set pin 26 is inserted into the apertures 25 of the bracket $17_1$ secured to the bridge member 6 of the crane frame 5, whereby the crane frame 5 and the operating rod $7_1$ are maintained vertical and horizontal respectively. Subsequently, the winch 10 is driven to pay away the rope 12 until the hook 11 engages a suitable mating member of the boat 23. Thereafter, the rope 12 is rewound to lift the boat 23 from the water surface 22 to a level corresponding to the level of the shore 21, whereupon the trailer is advanced by the tracting vehicle 24 until the suspended boat rests on the shore 21. Thereafter, the hook 11 of the rope 12 is disengaged from the boat 23 and then the set pin 26 is pulled out of the apertures 25 of the bracket $17_1$, whereby the operating rod $7_1$ is allowed to pivotally move about the shaft $18_1$ in a vertical plane and assume the vertical or folded position as shown by the imaginary lines in FIG. 6. Subsequently, the set pin 26 is again inserted into the apertures 25 to hold the operating rod $7_1$ in the folded position. Thereafter, the set pins $16_1$ and $16_2$ are removed from the apertures $15_1$ and $15_2$ to allow the support rods $3_1$ and $3_2$ of the crane frame 5 to pivotally move about the shafts $13_1$ and $13_2$ in a vertical plane and assume the horizontal position as shown by the imaginary lines in FIG. 5. Thus, the crane assembly is brought into a horizontal plane common to the plane of the trailer body and the entire trailer is now in the folded or inoperative position as shown in FIG. 4.

In this position of the trailer, the boat 23 once landed on the shore may be brought on board the trailer for transportation to a desired place, if it is required.

Unloading the boat from the trailer onto the water may be accomplished simply by reversing the above-described procedures of operation.

It will thus be appreciated that loading and unloading of the boat can be simply and readily accomplished by the present invention without any of the difficulties encountered by the trailers of the prior art. Moreover, when the crane is not in use, the crane frame and operating rod are readily folded in the horizontal plane common to the plane of the trailer body as shown in FIG. 4, and this is very useful to reduce the space occupied by the crane assembly and to make the trailer compact.

Figure 10:
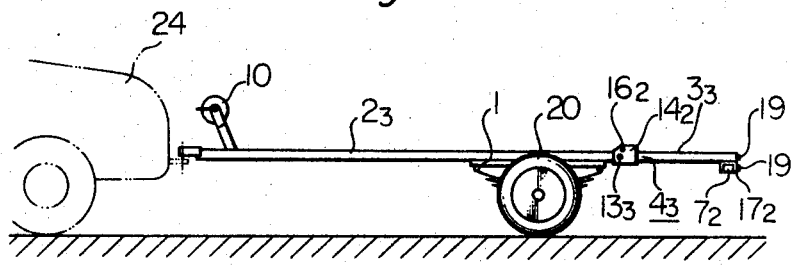
FIG. 10 is a side view of the same trailer with the crane assembly being in the folded or inoperative position.
Figure 11:
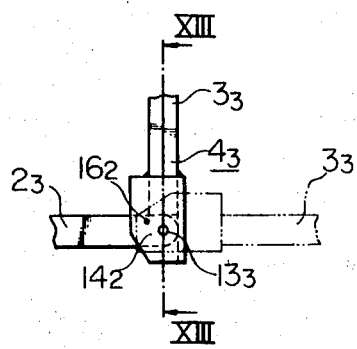
FIG. 11 is an enlarged side view showing a portion C of FIG. 7.
Figure 12:
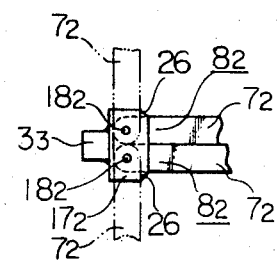
FIG. 12 is an enlarged plan view showing a portion D of FIG. 7.
Figure 16:
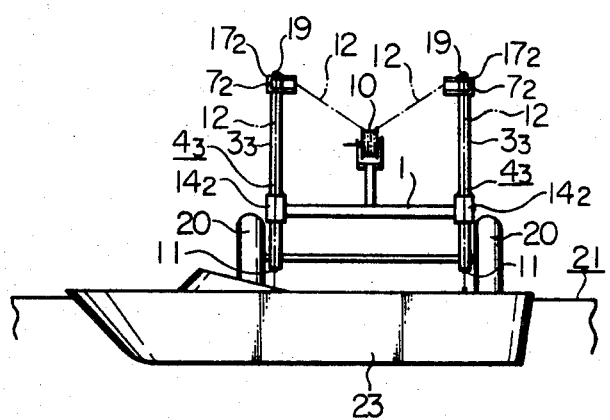
FIG. 16 is a rear end view of the same trailer.
Figure 17:
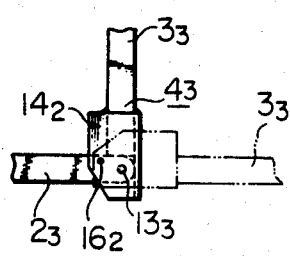
FIG. 17 is an enlarged side view showing a portion E of FIG. 14.

Referring to FIGS. 7 to 13, there is shown another embodiment of the present invention. This alternative embodiment differs from the above-described embodiment in that a square trailer frame 1 has a single longitudinal rod $2_3$ mounted centrally thereof and a single support rod $3_3$ is pivotally connected at one end thereof to the single longitudinal rod $2_3$. The pivotal connection of the single support rod $3_3$ to the single trailer rod $2_3$ is essentially similar to the connection of the support rod $3_1$ or $3_2$ to the trailer rod $2_1$ or $2_2$ in the previous embodiment. More specifically, the crane support rod $3_3$ is pivotally connected to the trailer rod $2_3$ by means of a shaft $13_3$, and a bracket $14_2$ secured to the support rod $3_3$ is formed with apertures for receiving a set pin $16_2$ to maintain the support rod $3_3$ in vertical position as shown in FIG. 11. It should further be noted that a pair of closely adjacent, parallel rods $7_2$ are pivotally connected to the other end of the single support rod $3_3$ in such a manner that the operating rods $7_2$ are pivotally movable in a horizontal plane about their respective pivots until the two operating rods are outwardly closed or axially aligned with each other as shown by the imaginary lines in FIG. 12. Such horizontally pivotal connection of the operating rods $7_2$ to the support rod $3_3$ is achieved by a bracket $17_2$ and respective pivot shafts $18_2$, the bracket $17_2$ being secured to the support rod $3_3$ at the top end thereof. The bracket $17_2$ is formed with apertures for receiving pins 26 to set the respective operating rods $7_2$ in horizontally folded position.

Figure 7:
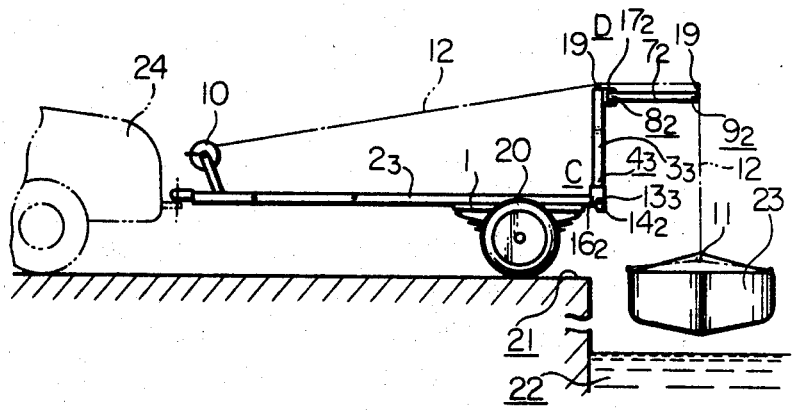
FIG. 7 is a side view of the trailer according to a second embodiment of the present invention.
Figure 8:
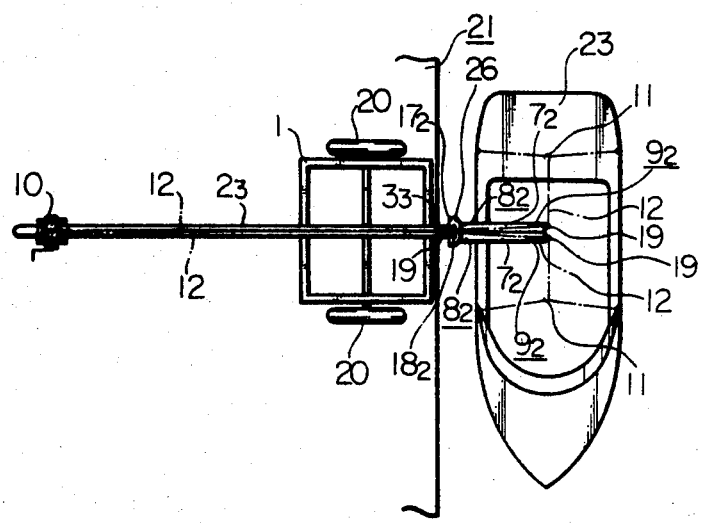
FIG. 8 is a plan view of the same trailer.
Figure 9:
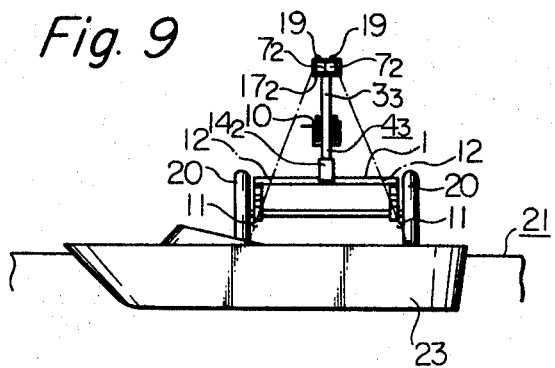
FIG. 9 is a rear end view of the same trailer.

In operation, the trailer body is brought into the operative position as shown in FIG. 7, with the crane support rod $3_3$ in vertical position (FIG. 11) and the operating rods $7_2$ in horizontally open or parallel position (FIG. 12), whereby there is attained the same result as described with respect to the previous embodiment. Thereafter, the trailer is brought into normal or inoperative position with the crane support rod $3_3$ in the horizontal position and the operating rod $7_2$ in the horizontally closed position as shown in FIG. 10.

In the embodiment now under discussion, it will be readily seen that each of the rods $3_3$ and $7_2$ has a guide roller or pulley 19 mounted thereon and the wire rope 12 is divided into two lines at a point beyond the guide 19 on top of the single support rod $3_3$. The other parts of the present embodiment are essentially similar to those of the previous embodiment.

Referring to FIGS. 14 to 18, there is shown a further embodiment of the present invention. In this embodiment, a pair of trailer rods $2_3$ have a pair of crane support rods $3_3$ connected thereto for pivotal movement in a vertical plane, and a pair of operating rods $7_2$ are connected to the pair of support rods $3_3$ for pivotal movement in a horizontal plane. Normally, the support rods $3_3$ are in horizontal position (see imaginary lines in FIG. 17) while the operating rods $7_2$ are horizontally inwardly closed to be in axial alignment with each other (see imaginary lines in FIG. 18).

Figure 18:
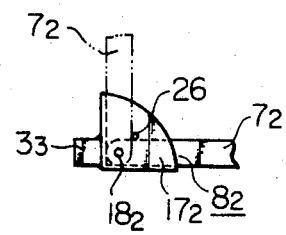
FIG. 18 is an enlarged plan view showing a portion F of FIG. 14.

In operation, the trailer is brought into the position shown in FIG. 14 with the support rods $3_3$ in the vertical position (FIG. 17) and the operating rods $7_2$ in the horizontally open or parallel position (FIG. 18). Each of the rods $3_3$ and $7_2$ has a guide roller or pulley 19 mounted thereon, and two wire ropes 12 are extended from the winch device 10 via opposite guide rollers or pulleys 19 toward the boat 23. Thus, the same effect may be provided as in the previous embodiment.

The other parts of this embodiment are identical with those described in the previous embodiment, and description thereof is omitted.

While the invention has been shown and described with respect to certain specific embodiments, it will be apparent to those skilled in the art that other various changes and modifications may be made therein without departing from the scope of the invention as defined in the appended claims.

What is claimed is:

1. A trailer capable of lifting and lowering boats or the like, comprising a trailer body; a crane assembly connected to the rear end of said trailer body for lifting and lowering boats or the like, said crane assembly comprising an inverted U-shaped frame including a pair of support rods integrally interconnected at the upper ends thereof by a transverse bridge member, said support rods being connected at the lower ends thereof to said trailer body for pivotal movement in a vertical plane, and a single operating rod connected to said transverse bridge member centrally thereof for pivotal movement in a vertical plane, said crane assembly thus being foldable to a position wherein said support rods are in a plane common to the horizontal plane of said trailer body and said operating rod is also in a horizontal plane;

a winch device mounted on said trailer body in the forward end portion thereof, and a rope wound on said winch device and having a free end provided with hook means, said rope being extended from said winch device along said operating rod of said crane assembly.

2. A trailer as claimed in claim 1, wherein said position is an inoperative position and said horizontal plane of said operating rod is below said plane of said support rods.

* * * * *